(12) United States Patent
Pleska

(10) Patent No.: US 9,732,179 B2
(45) Date of Patent: Aug. 15, 2017

(54) DILITHIUM INITIATORS

(71) Applicant: Fina Technology, Inc., Houston, TX (US)

(72) Inventor: Alexander Pleska, Rakovnik (CZ)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 15/189,233

(22) Filed: Jun. 22, 2016

(65) Prior Publication Data

US 2016/0376395 A1   Dec. 29, 2016

Related U.S. Application Data

(60) Provisional application No. 62/183,500, filed on Jun. 23, 2015.

(51) Int. Cl.
| | |
|---|---|
| C08F 4/46 | (2006.01) |
| C08F 4/56 | (2006.01) |
| C08F 2/00 | (2006.01) |
| C08F 36/00 | (2006.01) |
| C08F 297/04 | (2006.01) |
| C08F 136/06 | (2006.01) |
| C09J 147/00 | (2006.01) |
| C09J 153/02 | (2006.01) |

(52) U.S. Cl.
CPC ........ *C08F 297/042* (2013.01); *C08F 136/06* (2013.01); *C09J 147/00* (2013.01); *C09J 153/02* (2013.01)

(58) Field of Classification Search
CPC ... C08F 297/042; C08F 136/06; C09J 147/00; C09J 153/02
USPC ................... 526/175, 211, 173, 335
See application file for complete search history.

(56) References Cited

U.S. PATENT DOCUMENTS

| | | | |
|---|---|---|---|
| 3,055,952 A | 9/1962 | Goldberg | |
| 3,157,604 A | 11/1964 | Strobel | |
| 3,329,666 A * | 7/1967 | Stearns | ................... C08F 36/08 502/154 |
| 3,377,404 A | 4/1968 | Zelinski | |
| 3,598,793 A | 8/1971 | Russell | |
| 3,848,008 A | 11/1974 | Fetters | |
| 4,022,959 A | 5/1977 | Sommer et al. | |
| 4,025,478 A | 5/1977 | Jurrens | |
| 4,279,798 A | 7/1981 | Aggarwal et al. | |
| 4,696,986 A | 9/1987 | Halasa et al. | |
| 5,723,559 A | 3/1998 | Varshney et al. | |
| 2003/0040589 A1* | 2/2003 | Marechal | ................ C08F 12/04 526/173 |
| 2014/0296373 A1 | 10/2014 | Mabuchi et al. | |
| 2015/0197588 A1* | 7/2015 | Uehara | ................... C08F 36/22 525/321 |

FOREIGN PATENT DOCUMENTS

| | | |
|---|---|---|
| EP | 2835387 A1 | 2/2015 |
| WO | WO-2013028307 A1 | 2/2013 |

OTHER PUBLICATIONS

Beinert, et al., A bifunctional anionic initiator soluble in non-polar solvents. Makromol. Chem. 179:551-555, 1978.
Fetters and Morton, Synthesis and properties of block polymers. I. Poly-beta-methylstyrene-polyisoprene-poly-beta-methylstrene. Macromolecules, 2(5):453-458, 1969.
Hsieh and Quirk, Anionic polymerization: Principles and practical applications, New York: Marcel Dekker, 1996, Chapter 5, "General aspects of anionic polymerization," p. 93-127.
Long, et al., Synthesis and characterization of Poly(t-Butyl methacrylate-b-isoprene-b-t-butyl methacrylate) block copolymers by anionic techniques. J. Polym. Sci.: Part A, Polym. Chem., 27: 4001-4012, 1989.
Lutz, et al., Chimie Macromoleculaire. C.R. Acad. Sci. Paris, Ser. C, 283:123-125, 1976. (English language translation and Certification provided).
Houben-Weyl, Methoden der organischen Chemie, Eugen Müller Ed., Stuttgart: Georg Thieme Verlag, 1970, "Chapter V. Introduction of lithium into the organic compounds by addition reaction. a) Addition of metallic lithium on unsaturated compounds." 2 pages, p. 162-163. (English language translation provided).
Ziegler and Jakob, Chapter X11, Die, Katalyse der polymerisation von ungesattigten Kohlenwasserstoffen durch alkaliorganische verbindungen. Ann. 511:45-63, 1934. (English language translation and Certification provided).
PCT/US2016/038752 International Search Report and Written Opinion dated Sep. 13, 2016.

* cited by examiner

*Primary Examiner* — William Cheung

(74) *Attorney, Agent, or Firm* — Wilson Sonsini Goodrich & Rosati

(57) ABSTRACT

Disclosed herein are highly active dilithio initiators prepared from high molecular weight dienes (C≥6) and methods for the preparation of such compounds. These dilithio initiators result in greater control over polymer microstructure and provide useful polymers and oligomers with low vinyl incorporation.

11 Claims, 1 Drawing Sheet

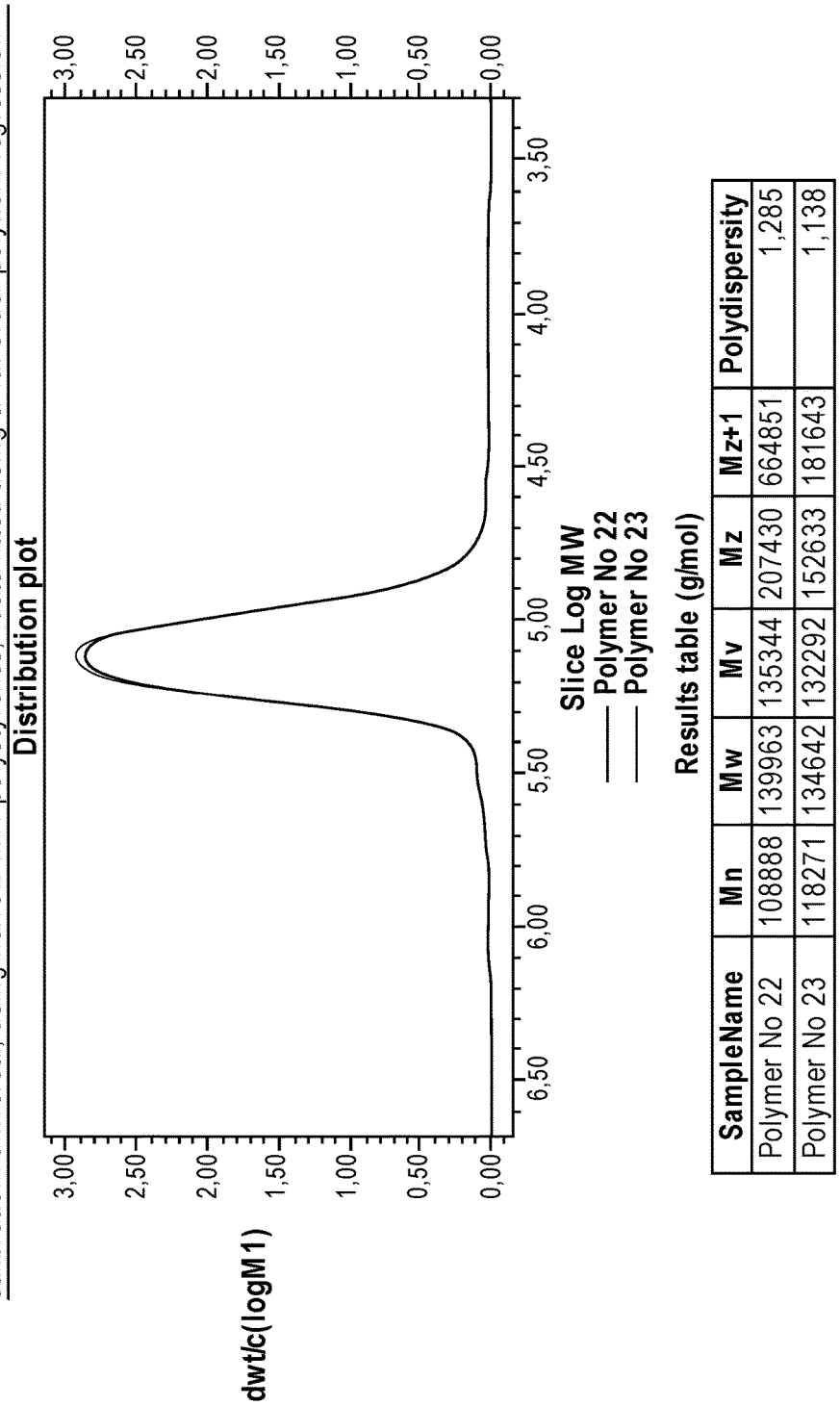

DILITHIUM INITIATORS

CROSS REFERENCE

This application claims the benefit of U.S. Provisional Application No. 62/183,500 filed Jun. 23, 2015, the entire contents of which is hereby incorporated by reference.

BACKGROUND OF THE INVENTION

Commercial dilithio initiators are produced from lithium and lower molecular weight dienes with C≤5, usually C4 monomers such as butadiene. Because dilithio initiators typically have limited solubility in hydrocarbon solvents, polar solvents with other modifiers are required to increase the solubility and efficacy of the initiators for polymerization. These dilithio initiators are used commercially to produce low molecular weight anionic oligomers, high molecular weight elastomers (both typically from diene and vinyl aromatic monomers), and styrene-diene-styrene block terpolymers. However, the requirement of polar solvents for dilithio initiator synthesis and application greatly restricts the control of microstructure of the diene monomer incorporation, resulting in products with high vinyl incorporation. Higher vinyl incorporation leads to high glass transition temperatures (Tg)s which further limits the application of the oligomers and polymers. As such, there is a need for developing oligomers and polymers that have low vinyl incorporation.

One such method is to develop active dilithio initiators that are more soluble than the conventional dilithio initiators derived from C≤5 dienes in non-polar solvents. Described herein are highly active dilithio initiators derived from high molecular weight dienes (C≥6), with the majority of the carbon count in a pendant chain. The use of high molecular weight dienes (C≥6) allows for the preparation of highly active dilithio initiators with a significant reduction of polar solvent required for solubility. As such, these highly active dilithio initiators result in greater control over polymer microstructure and result in useful polymers and oligomers with low vinyl incorporation.

SUMMARY OF THE INVENTION

Provided herein are compositions comprising lithium, a solvent or solvent mixture, and a compound represented by the following formula I:

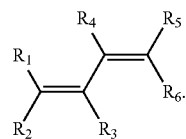

In some embodiments, $R_1$, $R_2$, and $R_3$ are hydrogen; $R_4$, $R_5$, and $R_6$ are independently hydrogen or alkyl containing one to thirty carbon atoms; and the number of carbon atoms in $R_4$, $R_5$, and $R_6$ combined is equal to or higher than six.

In some embodiments, the compositions further comprise a catalyst. In some embodiments, the solvent is a nonpolar hydrocarbon solvent. In some embodiments, the solvent mixture is a blend of a nonpolar hydrocarbon solvent and a polar solvent. In some embodiments, the amount of polar solvent is about 0.5% by weight to about 5% by weight. In some embodiments, the lithium is lithium metal. In some embodiments, the catalyst is naphthalene. In some embodiments, the catalyst further comprises a lithium alcoholate. In some embodiments, the lithium alcoholate is lithium 2-butanolate.

In some embodiments, formula I is:

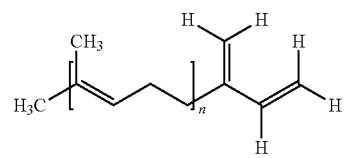

and n is 1 or 2.

In some embodiments, formula I is beta-farnesene. In some embodiments, formula I is beta-myrcene.

Also provided herein are methods for preparing a polymer comprising: a) preparing an initiator solution comprising: lithium, a solvent or solvent mixture, and a compound represented by the following formula I:

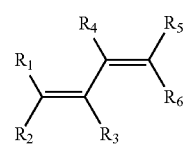

wherein $R_1$, $R_2$, and $R_3$ are hydrogen; $R_4$, $R_5$, and $R_6$ are independently hydrogen or alkyl containing one to thirty carbon atoms; and the number of carbon atoms in $R_4$, $R_5$, and $R_6$ combined is equal to or higher than six; b) contacting the initiator solution of (a) with an olefinic monomer in a polymerization solvent solution comprising optionally a vinyl-directing additive, to form a propagating polymer chain; and c) terminating by contacting the propagating polymer chain of (b) with a quenching agent.

In some embodiments, the compositions further comprise a catalyst. In some embodiments, the solvent is a nonpolar hydrocarbon solvent. In some embodiments, the solvent mixture is a blend of a nonpolar hydrocarbon solvent and a polar solvent. In some embodiments, the amount of polar solvent is about 0.5% by weight to about 5% by weight. In some embodiments, the lithium is lithium metal. In some embodiments, the catalyst is naphthalene. In some embodiments, the catalyst further comprises a lithium alcoholate. In some embodiments, the lithium alcoholate is lithium 2-butanolate. In some embodiments, the vinyl-directing additive comprises a chelating amine or ether.

In some embodiments, formula I is:

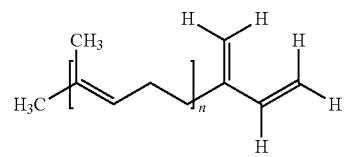

and n is 1 or 2.

In some embodiments, formula I is beta-farnesene. In some embodiments, formula I is beta-myrcene.

In some embodiments, the olefinic monomer comprises at least one of a diene and a vinyl aromatic. In some embodiments, the diene is butadiene and the vinyl aromatic is styrene. In some embodiments, the quenching agent is polypropylene oxide. In some embodiments, the quenching agent is a protic source.

Also disclosed is the polymer derived from the methods disclosed herein. In some embodiments, the vinyl content is below 20%. In some embodiments, the vinyl content is about 10% to about 20%. Also provided herein is an engineered rubber product produced from the polymers disclosed herein. Also provided herein is thermoplastic olefin produced from the polymers disclosed herein. In some embodiments, the engineered rubber product is a tire, a power transfer belt, a conveyor belt, a hose, a seal, a gasket, or a sheeted rubber product. Also provided herein is an adhesive produced from the polymers disclosed herein. In some embodiments, the adhesive is a hot-melt adhesive, a construction adhesive, an elastic film, or a pressure-sensitive adhesive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

The FIGURE shows the gel permeation chromatograms of the polymer No. 22 and polymer No. 23.

DETAILED DESCRIPTION OF THE INVENTION

Difunctional initiators of anionic polymerization enable the preparation of "living" polymers having reactive C—Li groups on both ends of linear polymeric chain. By using the reactivity of terminal C—Li groups, a variety of telechelic polymers may be prepared. Hydroxyl terminated telechelic polymers are prepared from the addition reaction of ethyleneoxide or propyleneoxide; carboxyl terminated telechelic polymers from the addition of carbon dioxide; or polymers without functional groups are prepared from hydrolysis. Technically important liquid polymers of butadiene are produced from these methods. Furthermore, the difunctional initiators are also used to prepare block copolymers, e.g., styrene-butadiene-styrene copolymers having properties of thermoplastic elastomers.

Commercially used difunctional initiators are typically based on carbanions stabilized by a lithium anion. These polar dilithio initiators are highly associated and exhibit limited or no solubility in standard hydrocarbon solvents. Polar solvents, typically ethers, are employed in the production and storage of the dilithio initiators, and also as the reaction media of the resulting polymerization. The addition of Lewis bases or lithium alkoxides can improve the systems, but similar to ethers, at the expense of microstructural control. The lack of solubility of dilithio initiators in hydrocarbon media limits their application in the production of commercial polymers. Soluble dilithio initiators have been reported, but are based on butyllithium adducts of aromatic precursors and have disadvantages. Though soluble, the initiator species are highly aggregated in solution and are slow to initiate, which results in broad or multimodal molecular weight distributions, side-reactions, and the potential for >2 functionality.

Difunctional initiators are typically prepared from the reaction of lithium with butadiene, isoprene, dimethylbutadiene, styrene or alpha-methylstyrene (Houben-Weyl Methoden der organischen Chemie, E. Müller Ed. Band 13/I, Georg Thieme 1970; H. L. Hsieh, R. P. Quirk, Anionic polymerization—principles and practical applications, Marcel Dekker 1996). Ziegler was probably the first to describe this reaction (K. Ziegler, L. Jakob, Ann. 511, 45 (1934). Various modifications to the reaction have been published (e.g. U.S. Pat. No. 3,157,604). For these methods, lithium based initiators derived from butadiene and isoprene are especially suitable for anionic polymerization because they provide polymers with low content of vinyl microstructure. However, the preparation of such initiators requires the presence of strongly solvating ethers, such as tetrahydrofuran, which, in the subsequent polymerization leads to undesirable high vinyl content in the polydiene. Thus, recent efforts have been made to adjust the solvating ability of the reaction media in order to minimize the formation of vinyl groups in the subsequent polymerization.

Described herein are methods for the preparation of highly active dilithio initiators prepared from high molecular weight dienes (C≥6). The use of high molecular weight dienes (C≥6) allow for the preparation of such highly active dilithio initiators with a significant reduction of polar solvent typically required for solubility when compared to dilithio initiators prepared from low molecular dienes, such as butadiene and isoprene. As such, the active dilithio initiators of this present application result in greater control over polymer microstructure and provide polymers and oligomers with low vinyl incorporation.

Definitions

As used herein, the term "about" is used synonymously with the term "approximately." Illustratively, the use of the term "about" with regard to an amount indicates that values slightly outside the cited values, e.g., plus or minus 0.1% to 10%.

As used herein, the terms "comprising," "including," "such as," and "for example" (or "e.g.") are used in their open, non-limiting sense.

An "alkyl" group refers to an aliphatic hydrocarbon group. The alkyl group is branched or straight chain. In some embodiments, the "alkyl" group has 1 to 6 carbon atoms, i.e., a $C_1$-$C_6$ alkyl unless specified otherwise. In some embodiments, the "alkyl" group has 1 to 10 carbon atoms, i.e., a $C_1$-$C_{10}$ alkyl, unless specified otherwise. Whenever it appears herein, a numerical range such as "1 to 10" refers to each integer in the given range; e.g., "1 to 10 carbon atoms" means that the alkyl group consist of 1 carbon atom, 2 carbon atoms, 3 carbon atoms, etc., up to and including 10 carbon atoms, although the present definition also covers the occurrence of the term "alkyl" where no numerical range is designated. In some embodiments, an alkyl is a $C_1$-$C_6$ alkyl. In one aspect the alkyl is methyl, ethyl, propyl, iso-propyl, n-butyl, iso-butyl, sec-butyl, or t-butyl. Typical alkyl groups include, but are in no way limited to, methyl, ethyl, propyl, isopropyl, butyl, isobutyl, sec-butyl, tertiary butyl, pentyl, neopentyl, or hexyl.

As used herein, the term "% wt" refers to the weight percent of a given component in composition or reaction mixture. As used herein, synonymous with "% by weight".

Dilithio Initiators

Difunctional initiators are used in anionic "living" polymerization to produce well-defined diene-based oligomers and polymers with both chain ends containing an active site. By maintaining active anionic sites at both chain ends, there exists the potential to further react the chain ends with reactive additives to produce near quantitative difunctional products. Butadiene, isoprene, dimethylbutadiene, styrene and alpha-methylstyrene are the dienes typically used for the preparation of dilithium initiators. However, the necessity of employing polar solvents in high concentrations for their formation and use limits their utility for diene polymerization since the unique ability of lithium to provide high 1,4-polydiene microstructure is lost in polar media. As a consequence, there is a need to discover a hydrocarbon-soluble, difunctional organolithium initiator that initiates the polymerization of styrene and diene monomers to form monomodal am-dianionic polymers at a rate faster than or comparable to the rates of polymerization (i.e., to form narrow molecular weight distribution polymers).

Two general routes to hydrocarbon soluble dilithium initiators have been reported in the scientific literature. The first route relies on the coupling of radical anions. As an example, Morton et al. published the synthesis of 1,1-diphenylethylene (DPE) dimer in the presence of a fine dispersion of lithium in an anisole-containing hydrocarbon solvent (Fetters, L. J., Morton, M., *Macromolecules* 1969, 2, 453 and U.S. Pat. No. 3,848,008). This method allows for the use of 1,1-diphenylethylene or internally double-bonded conjugated dienes with low solvating solvents, such as triethylamine or anisole and their mixtures with hydrocarbons, with minimal impact on the vinyl microstructure of the diene polymer. The second route to hydrocarbon soluble dilithium initiators relies on the reaction of an aromatic divinyl precursor with two moles of butyllithium. Because of the tendency of organolithium chain ends to exist predominantly in hydrocarbon solution as associated, electron-deficient species such as dimers, tetramers, and hexamers, attempts to prepare dilithium initiators in hydrocarbons solutions have resulted in the formation of insoluble, three-dimensionally associated species. These precipitates are not effective initiators because their heterogeneous initiation reactions with monomers tend to result in broader molecular weight distributions (Mw/Mn>1.1), at best. The strategies that have been employed in the search for hydrocarbon-soluble, dilithium initiators generally utilize soluble analogs of these difunctional initiators. Another method to solubilize these initiators is to use a seeding technique, by which diene monomers are added to form a hydrocarbon-soluble, oligomeric dilithium initiating species. In general, none of these methods have provided a simple, stable, reproducible, hydrocarbon-soluble dilithium initiator. The precursor should have a steric hindrance or a low ceiling temperature in order to avoid competition between metalation and homopolymerization. 1,3-Divinylbenzene, 1,3-bis(1-phenylethenyl)benzene (MDDPE), and 1,3-diisopropenylbenzene (DIPB) have been proposed as potential precursors (Long, T. E. et al. *J. Polym. Sci.: Part A, Polym. Chem.* 1989, 27, 4001; Lutz, P. E. Franta, and P. Rempp, *C. R. Acad. Sci.* Ser. C 1976, 283, 123; and Beinert, G. P. Lutz, E. Franta, and P. Rempp, *Makromol. Chem.* 1978, 179, 551).

The dilithium initiators described herein utilize higher molecular weight dienes (C≥6) for anionic polymerization. This results in greater control over polymer microstructure by reducing the need for polar solvents in the production of the initiators. Furthermore, the hydrocarbon-soluble dilithium initiators described herein are stable and reproducible.

Compositions

Provided herein are compositions comprising lithium, a solvent or solvent mixture, and a compound represented by the following formula I:

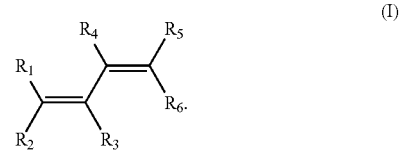

In some embodiments, $R_1$, $R_2$, and $R_3$ are hydrogen; $R_4$, $R_5$, and $R_6$ are independently hydrogen or alkyl containing one to thirty carbon atoms; and the number of carbon atoms in $R_4$, $R_5$, and $R_6$ combined is equal to or higher than six.

Dienes

Compounds suitable for dilithio initiator synthesis include conjugated dienes.

In some embodiments, formula I is

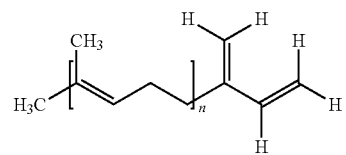

and n is 1 or 2.

In some embodiments, formula I is farnesene. In some embodiments, formula I is myrcene. In some embodiments, formula I is beta-farnesene. In some embodiments, formula I is beta-myrcene.

In some embodiments, the concentration of the diene or the compound of formula I is below about 30% wt. In some embodiments, the concentration of the diene or the compound of formula I is below about 25% wt. In some embodiments, the concentration of the diene or the compound of formula I is below about 20% wt. In some embodiments, the concentration of the diene or the compound of formula I is below about 15% wt. In some embodiments, the concentration of the diene or the compound of formula I is below about 10% wt. In some embodiments, the concentration of the diene or the compound of formula I is below about 5% wt.

Solvent and/or Solvent Mixture for Initiator Formation

In some embodiments, the solvent is a nonpolar hydrocarbon solvent. Suitable nonpolar solvents include but are not limited to toluene, benzene, xylenes, hexane, heptane and cyclohexane. In some embodiments, the nonpolar hydrocarbon solvent is toluene, benzene, xylenes, hexanes, heptane or cyclohexane. In some embodiments, the nonpolar hydrocarbon solvent is toluene. In some embodiments, the nonpolar hydrocarbon solvent is benzene. In some embodiments, the nonpolar hydrocarbon solvent is cyclohexane. In some embodiments, the nonpolar hydrocarbon solvent is xylenes. In some embodiments, the nonpolar hydrocarbon solvent is hexanes. In some embodiments, the nonpolar hydrocarbon solvent is heptanes.

In some embodiments, the solvent mixture is a blend of a nonpolar hydrocarbon solvent and a polar solvent. In some embodiments, the amount of polar solvent present is about 0.5% wt to about 100% wt. In some embodiments, the polar solvent is present in an amount less than 5% wt. In some embodiments, the amount of polar solvent present is about 0.5% wt, about 1% wt, about 2% wt, about 3% wt, about 4% wt, about 5% wt, about 6% wt, about 7% wt, about 8% wt, about 9% wt, or about 10% wt. In some embodiments, the amount of polar solvent present is about 0.5% wt to about 5% wt. In some embodiments, the amount of polar solvent present is about 0.5% wt to about 10% wt. In some embodiments, the amount of polar solvent present is about 1% wt to about 5% wt. In some embodiments, the amount of polar solvent present is about 2% wt to about 3% wt. In some embodiments, the amount of polar solvent present is about 5% wt.

In some embodiments, the polar solvent is a solvent that accelerates and improves initiator formation. Suitable examples but are not limited to include ethers and amines. Examples of ethers include but are not limited to dimethyl ether, diethyl ether, methyl isopropyl ether, methyl tertbutyl ether (MTBE), ethyleneglycol dimethylether, diglyme, dioxane and tetrahydrofuran. Additional examples of ethers include methyl- and ethyl ethers. Examples of amines include but are not limited to trimethylamine, triethylamine, and tetramethylene diamine. Additional examples of amines include methyl- and ethyl amines. In some embodiments, the polar solvent is an ether. In some embodiments, the polar solvent is methyl tertbutyl ether (MTBE). In some embodiments, the polar solvent is tetrahydrofuran. In some embodiments, the polar solvent is an amine. In some embodiments, the polar solvent is triethylamine.

Lithium

In some embodiments, the lithium is lithium metal. In some embodiments, the lithium metal is lithium granulate. In some embodiments, the particle size of the lithium granulate is about 2 mm to about 10 mm. In some embodiments, the particle size of the lithium granulate is about 2 mm. In some embodiments, the particle size of the lithium granulate is about 10 mm.

Catalyst

In some embodiments, the compositions further comprise a catalyst. In some embodiments, the catalyst reacts with lithium to yield an adduct that transfers lithium to the diene while releasing the catalyst for another reaction. In some embodiments, the appropriate catalysts are compounds that enable the preparation of the dilithio-monoadduct (or dilithio-monodiene adduct). Suitable catalysts include, but are not limited, to naphthalene, diphenyl, terphenyl, anthracene, and other hydrocarbons. In some embodiments, the catalyst is naphthalene, alkyl substituted naphthalene, diphenyl, terphenyl, anthracene, and other conjugated aromatics. In some embodiments, the catalyst is naphthalene.

In some embodiments, the amount of catalyst is about 0.05% wt to about 5% wt. In some embodiments, the amount of catalyst is about 0.1% wt to about 0.2% wt. In some embodiments, the amount of catalyst is about 0.5% wt. In some embodiments, the amount of catalyst is about 1% wt. In some embodiments, the amount of catalyst is about 2% wt. In some embodiments, the amount of catalyst is about 3% wt. In some embodiments, the amount of catalyst is about 4% wt. In some embodiments, the amount of catalyst is about 5% wt.

In some embodiments, the catalyst further comprises a lithium alcoholate. Appropriate lithium alcoholates includes any lithium alcoholates that increase the reaction rate of initiator synthesis. Suitable lithium alcoholates are derived from primary and secondary aliphatic and cycloaliphatic alcohols. Examples include but are not limited to lithium 1-propanolate, lithium 2-butanolate, lithium 2-propanolate, lithium 1-ethanolate, and lithium cyclohexanolate. In some embodiments, the lithium alcoholate is lithium 1-propanolate, lithium 2-butanolate, lithium 2-propanolate, lithium 1-ethanolate, or lithium cyclohexanolate. In some embodiments, the lithium alcoholate species is lithium 2-butanolate.

In some embodiments, the amount of lithium alcoholate is about 10% to about 200% mole to diene. In some embodiments, the amount of lithium alcoholate is about 10% to about 50% mole to diene. In some embodiments, the amount of lithium alcoholate is about 10% to about 20% mole to diene. In some embodiments, the amount of lithium alcoholate is about 5% to about 200% mole to diene. In some embodiments, the amount of lithium alcoholate is about 5% to about 50% mole to diene. In some embodiments, the amount of lithium alcoholate is about 5% to about 20% mole to diene.

The dilithio initiators described herein can be prepared from the dienes of formula I in a solvent or solvent mixture. In some instances, the solvent is a nonpolar solvent, such a toluene or benzene. In some embodiments, the solvent mixture is a blend of nonpolar hydrocarbon solvent and a polar solvent. In some instances, the polar solvent is an ether, such as methyl tertbutyl ether, or an amine, such as triethylamine. In some instances, the amount of polar solvent present is about 0.5% wt to about 5% wt. In some instances, the amount of polar solvent present is about 1% wt to about 5% wt. In some instances the amount of polar solvent present is about 5% wt and the polar solvent is triethylamine. In some instances, the amount of polar solvent present is about 2% wt to about 3% wt and the polar solvent is methyl-tertbutyl ether. In some instances, the initiator is prepared from benzene with triethylamine. In other instances, the intiator is prepared from toluene with low amounts of methyl-tertbutyl ether. As the formation of the initiator competes with polymerization of diene on the already formed initiator; the reaction conditions for dilithio initiator formation disclosed herein minimize the polymerization reaction. Such reaction conditions include maintaining a low temperature and a low diene concentration during initiator formation. This includes adding the diene according at the same rate that the solid lithium metal is dissolved. In some embodiments, the appropriate temperature for dilithio formation is about −5° C. to about 35° C. In some embodiments, the appropriate temperature for dilithio formation is about −15° C. to about 35° C. In some embodiments, the appropriate temperature for dilithio formation is about −5° C. to about 30° C. In some embodiments, the appropriate temperature for dilithio formation is about −10° C. to about 30° C. In some embodiments, the appropriate temperature for dilithio formation is about −5° C. to about 10° C. In some embodiments, the appropriate temperature for dilithio formation is about −10° C. to about 10° C. In some embodiments, the appropriate temperature for dilithio formation is about −10° C. to about 30° C.

In some embodiments, a catalyst is added to facilitate dilithio inititiator synthesis. In some embodiments, the catalyst is naphthalene. In some embodiments, the catalyst further comprises a lithium alcoholate. The lithium alcoholate is prepared in situ by adding the alcohol directly to the reaction mixture or adding the alcohol as a solution, such as in toluene.

In some instances, where there is no catalyst, such as naphthalene, and the methyl tertbutyl ether is used as the polar solvent, 1 mol of C—Li organometal bond is formed per 1 mol of diene, which suggests that the presence of the dimer structure of the initiator and may be confirmed by GPC analysis. Polymerization with the dilithio initiator results in polymer product that exhibit high content of difunctional polymer In some instances, wherein the catalyst is naphthalene, the mole ratio of reacted lithium per diene is greater than 1, which suggests formation of monomeric adduct. These initiators prepared with naphthalene are also soluble and enable the preparation of polymer with high difunctional content.

In some instances, the prepared initiators described herein can be stored for several weeks at 0° C. without significant loss of activity.

Methods

Provided herein are methods for preparing a polymer comprising: a) preparing an initiator solution comprising: lithium, a solvent or solvent mixture, and a compound represented by the following formula I:

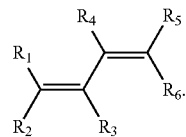

I

In some embodiments, $R_1$, $R_2$, and $R_3$ are hydrogen; $R_4$, $R_5$, and $R_6$ are independently hydrogen or alkyl containing one to thirty carbon atoms; and the number of carbon atoms in $R_4$, $R_5$, and $R_6$ combined is equal to or higher than six. In some embodiments, the methods further comprise: b) contacting the initiator solution of (a) with an olefinic monomer in a polymerization solvent solution comprising a vinyl-directing additive, to form a propagating polymer chain; and c) terminating by contacting the propagating polymer chain of (b) with a quenching agent.

Dienes

Compounds suitable for dilithio initiator synthesis include conjugated dienes.

In some embodiments, formula I is

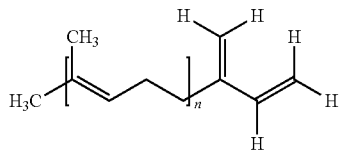

and n is 1 or 2.

In some embodiments, formula I is farnesene. In some embodiments, formula I is myrcene. In some embodiments, formula I is beta-farnesene. In some embodiments, formula I is beta-myrcene.

In some embodiments, the concentration of the diene or the compound of formula I is below about 30% wt. In some embodiments, the concentration of the diene or the compound of formula I is below about 25% wt. In some embodiments, the concentration of the diene or the compound of formula I is below about 20% wt. In some embodiments, the concentration of the diene or the compound of formula I is below about 15% wt. In some embodiments, the concentration of the diene or the compound of formula I is below about 10% wt. In some embodiments, the concentration of the diene or the compound of formula I is below about 5% wt.

Solvent and/or Solvent Mixture for Initiator Formation

In some embodiments, the solvent is a nonpolar hydrocarbon solvent. Suitable nonpolar solvents include but are not limited to toluene, benzene, xylenes, hexane, heptane and cyclohexane. In some embodiments, the nonpolar hydrocarbon solvent is toluene, benzene, xylenes, hexanes, heptane or cyclohexane. In some embodiments, the nonpolar hydrocarbon solvent is toluene. In some embodiments, the nonpolar hydrocarbon solvent is benzene. In some embodiments, the nonpolar hydrocarbon solvent is cyclohexane. In some embodiments, the nonpolar hydrocarbon solvent is xylenes. In some embodiments, the nonpolar hydrocarbon solvent is hexanes. In some embodiments, the nonpolar hydrocarbon solvent is heptanes.

In some embodiments, the solvent mixture is a blend of a nonpolar hydrocarbon solvent and a polar solvent. In some embodiments, the amount of polar solvent present is about 0.5% wt to about 100% wt. In some embodiments, the polar solvent is present in an amount less than 5% wt. In some embodiments, the amount of polar solvent present is about 0.5% wt, about 1% wt, about 2% wt, about 3% wt, about 4% wt, about 5% wt, about 6% wt, about 7% wt, about 8% wt, about 9% wt, or about 10% wt. In some embodiments, the amount of polar solvent present is about 0.5% wt to about 5% wt. In some embodiments, the amount of polar solvent present is about 0.5% wt to about 10% wt. In some embodiments, the amount of polar solvent present is about 1% wt to about 5% wt. In some embodiments, the amount of polar solvent present is about 2% wt to about 3% wt. In some embodiments, the amount of polar solvent present is about 5% wt.

In some embodiments, the polar solvent is a solvent that accelerates and improves initiator formation. Suitable examples include, but are not limited to, ethers and amines. Examples of ethers include but are not limited to dimethyl ether, diethyl ether, methyl isopropyl ether, methyl tertbutyl ether (MTBE), ethyleneglycol dimethylether, diglyme, dioxane and tetrahydrofuran. Additional examples of ethers include methyl- and ethyl ethers. Examples of amines include but are not limited to trimethylamine, triethylamine, and tetramethylene diamine. Additional examples of amines include methyl- and ethyl amines. In some embodiments, the polar solvent is an ether. In some embodiments, the polar solvent is methyl tertbutyl ether (MTBE). In some embodiments, the polar solvent is tetrahydrofuran. In some embodiments, the polar solvent is an amine. In some embodiments, the polar solvent is triethylamine.

Lithium

In some embodiments, the lithium is lithium metal. In some embodiments, the lithium metal is lithium granulate. In some embodiments, the particle size of the lithium granulate is about 2 mm to about 10 mm. In some embodiments, the particle size of the lithium granulate is about 2 mm. In some embodiments, the particle size of the lithium granulate is about 10 mm.

Catalyst

In some embodiments, the composition further comprises a catalyst. In some embodiments, the catalyst reacts with lithium to yield an adduct that transfers lithium to the diene while releasing the catalyst for another reaction. In some embodiments, the appropriate catalysts are compounds that enable the preparation of the dilithio-monoadduct (or dilithio-monodiene adduct). Suitable catalysts include, but are not limited, to naphthalene, diphenyl, terphenyl, anthracene, and other hydrocarbons. In some embodiments, the catalyst is naphthalene, alkyl substituted naphthalene, diphenyl, terphenyl, anthracene, and other conjugated aromatics. In some embodiments, the catalyst is naphthalene.

In some embodiments, the amount of catalyst is about 0.05% wt to about 5% wt. In some embodiments, the amount of catalyst is about 0.1% wt to about 0.2% wt. In some embodiments, the amount of catalyst is about 0.5% wt. In some embodiments, the amount of catalyst is about 1% wt. In some embodiments, the amount of catalyst is about 2% wt. In some embodiments, the amount of catalyst is about 3% wt. In some embodiments, the amount of catalyst is about 4% wt. In some embodiments, the amount of catalyst is about 5% wt.

In some embodiments, the catalyst further comprises a lithium alcoholate. Appropriate lithium alcoholates include any lithium alcoholates that increase the reaction rate of initiator synthesis. Suitable lithium alcoholates are derived from primary and secondary aliphatic and cycloaliphatic alcohols. Examples include but are not limited to lithium 1-propanolate, lithium 2-butanolate, lithium 2-propanolate, lithium 1-ethanolate, and lithium cyclohexanolate. In some embodiments, the lithium alcohoholate is lithium 1-propanolate, lithium 2-butanolate, lithium 2-propanolate, lithium 1-ethanolate, or lithium cyclohexanolate. In some embodiments, the lithium alcoholate species is lithium 2-butanolate.

In some embodiments, the amount of lithium alcoholate is about 10% to about 200% mole to diene. In some embodiments, the amount of lithium alcoholate is about 10% to about 50% mole to diene. In some embodiments, the amount of lithium alcoholate is about 10% to about 20% mole to diene. In some embodiments, the amount of lithium alcoholate is about 5% to about 200% mole to diene. In some embodiments, the amount of lithium alcoholate is about 5% to about 50% mole to diene. In some embodiments, the amount of lithium alcoholate is about 5% to about 20% mole to diene.

Olefinic Monomer

Suitable olefinic monomers include dienes and/or vinyl aromatic monomers. In some embodiments, the polymer is prepared by contacting the initiator solution with a diene in a polymerization solvent solution comprising optionally a vinyl-directing additive to form a propagating polymer chain. In some embodiments, the polymer is prepared by contacting the initiator solution with a vinyl aromatic monomer in a polymerization solvent solution comprising optionally a vinyl-directing additive to form a propagating polymer chain.

In some embodiments, the polymer is prepared by contacting the initiator solution with a diene followed by a vinyl aromatic monomer in a polymerization solvent solution comprising optionally a vinyl-directing additive to form a propagating polymer chain. In some embodiments, the polymer is prepared by contacting the initiator solution with a combination of a diene and a vinyl aromatic monomer in a polymerization solvent solution comprising optionally a vinyl-directing additive to form a propagating polymer chain. In some embodiments, the polymer is prepared by contacting the initiator solution with a diene followed by another diene in a polymerization solvent solution comprising optionally a vinyl-directing additive to form a propagating polymer chain. In some embodiments, the polymer is prepared by contacting the initiator solution with a combination of more than one diene in a polymerization solvent solution comprising optionally a vinyl-directing additive to form a propagating polymer chain. In some embodiments, the polymer is prepared by contacting the initiator solution with a vinyl aromatic monomer followed by a diene in a polymerization solvent solution comprising optionally a vinyl-directing additive to form a propagating polymer chain. In some embodiments, the polymer is prepared by contacting the initiator solution with a vinyl aromatic monomer followed by a diene in a polymerization solvent solution comprising optionally a vinyl-directing additive in a polymerization solvent solution followed by a vinyl aromatic monomer to form a propagating polymer chain. [e.g. S—B—S—B—S copolymer]. In some embodiments, the polymer is prepared by contacting the initiator solution with a combination of a vinyl aromatic monomer and a diene in a polymerization solvent solution comprising optionally a vinyl-directing additive to form a propagating polymer chain. In some embodiments, the polymer is prepared by contacting the initiator solution with a vinyl aromatic monomer followed by another vinyl aromatic monomer in a polymerization solvent solution comprising optionally a vinyl-directing additive to form a propagating polymer chain. In some embodiments, the polymer is prepared by contacting the initiator solution with a combination of more than one vinyl aromatic monomer in a polymerization solvent solution comprising optionally a vinyl-directing additive to form a propagating polymer chain.

Examples of suitable dienes include but are not limited to conjugated dienes that contain from 4 to 15 carbon atoms. Suitable compounds including but not limited to 1,3-butadiene, isoprene, 2,3-dimethyl-1,3-butadiene, piperylene, and 2-phenyl-1-3-butadiene, 2-phenyl-1,3-butadiene, beta-myrcene, and beta-farnesene and the like, alone or in admixture. In some embodiments, the diene is isoprene. In some embodiments, the diene is butadiene. In some embodiments, the diene is beta-myrcene. In some embodiments, the diene is beta farnesene.

Suitable vinyl aromatic monomers are ethylenically unsaturated monomers that are compatible with the dilithio initiators and polymerization reactions disclosed herein. In some embodiments, vinyl aromatic monomers contain from 8 to 20 carbon atoms. In some embodiments, vinyl aromatic monomer contain from 8 to 14 carbon atoms. Examples of suitable vinyl aromatic monomers include but are not limited 1-vinylnaphthalene, 2-vinylnaphthalene, styrene, α-methylstyrene, bromostyrene, chlorostyrene, fluorostyrene, 4-phenylstyrene, 3-methylstyrene, divinyl benzene and the like. In some embodiments, the vinyl aromatic monomer is styrene.

In some embodiments, the olefin monomer comprises at least one diene. In some embodiments, the olefin monomer comprises at least one vinyl aromatic. In some embodiments, the diene is butadiene. In some embodiments, the vinyl aromatic is styrene.

In some embodiments, the olefin monomer comprises at least one of a diene and a vinyl aromatic. In some embodiments, the diene is butadiene and the vinyl aromatic is styrene.

Other suitable monomers suitable for polymerization include but are not limited to alkyl acrylates, vinyl and vinylidene monomers (such as vinyl aromatic monomers, α-olefins, vinyl halides, and vinyl esters); α,β-olefinically unsaturated nitriles, and α,β-olefinically unsaturated amides. Examples of suitable acrylates include but are not limited to methyl acrylate, ethyl acrylate, butyl acrylate, methyl methacrylate and the like. Examples of suitable vinyl and vinylidene monomers include monomers having one or more terminal $CH_2$=CH-groups and/or $CH_2$=C-groups, such as vinyl aromatic monomers, α-olefins, vinyl halides, and vinyl esters. Examples of suitable α-olefins include but are not limited to ethylene, propylene, 1-butene and the like. Examples of suitable vinyl halides include but are not limited to vinylbromide, chloroethane (vinylchloride), vinylfluoride, vinyliodide, 1,2-dibromoethene, 1,1-dichloroethene (vinylidene chloride), 1,2-dichloroethene and the like. An example of a suitable vinyl ester includes but is not limited to vinyl acetate. Examples of suitable α,β-olefinically unsaturated nitriles include but are not limited to acrylonitrile, methacrylonitrile, and the like. Examples of suitable α,β-olefinically unsaturated amides include but are not limited to acrylamide, N-methyl acrylamide, N,N-dimethylacrylamide, methacrylamide and the like.

Polymerization Solvent Solution and Vinyl-Directing Additives

In some embodiments, the polymerization solvent solution comprises a vinyl-directing additive. Suitable vinyl-directing additives, or modifiers, are compounds that modify the vinyl group content of the polymer formed by the amount and type of vinyl-directing additive used. In some embodiments, vinyl-additive is a Lewis Base. In some embodiments, the vinyl-directing additives are compounds that act as copolymer structure randomizers. In some embodiments, the copolymer structure randomizers are the polar modifiers disclosed herein. Suitable vinyl-directing additives include ethers and tertiary amines. Examples of appropriate ethers include but are not limited to diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether and the like. Examples of appropriate amines include but are not limited to trimethylamine, triethylamine, N, N, N',N'-tetramethylethylenediamine, N-methyl morpholine, N-ethyl morpholine, N-phenyl morpholine, dipiperidinoethane, dipyrrolidinoethane, and the like. Further examples of appropriate ethers and tertiary amines include those disclosed in U.S. Pat. No. 4,022,959 and its contents related to the disclosure of such compounds is incorporated by reference in its entirety.

In some embodiments the vinyl-directing additive comprises a chelating amine or ether. In some embodiments, the vinyl-directing additive comprises a chelating amine. In some embodiments, the amine is dipiperidinoethane, dipyrrolidinoethane, or tetramethylethylene diamine. In some embodiments, the vinyl-directing additive comprises an ether. In some embodiments, the ether is diethylene glycol, dimethyl ether or tetrahydrofuran.

In some embodiments the vinyl-directing additive comprises metal alcoholate. In some embodiments the vinyl-directing additive comprises a potassium alcoholate. In some embodiments, the vinyl-directing additive comprises a potassium tert-butyl alcoholate.

Additional examples of suitable additives include tri-substituted alkoxybenzenes, such as 1,2,3-trialkoxybenzenes and 1,2,4-trialkoxybenzenes. Examples of tri-substituted alkoxybenzenes include but are not limited to 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene. In some embodiments, the vinyl-directing additive comprises a tri-substituted alkoxybenzene. Further examples of appropriate tri-substituted alkoxybenzenes include those disclosed in U.S. Pat. No. 4,696,986 and its contents related to the disclosure of such compounds is incorporated by reference in its entirety.

In some embodiments, the polymerization solvent solution comprises a nonpolar hydrocarbon solvent. Suitable nonpolar solvents include but are not limited to toluene, benzene, xylenes, hexane, heptane and cyclohexane. In some embodiments, the nonpolar hydrocarbon solvent is toluene, benzene, xylenes, hexanes, heptane or cyclohexane. In some embodiments, the nonpolar hydrocarbon solvent is toluene. In some embodiments, the nonpolar hydrocarbon solvent is benzene. In some embodiments, the nonpolar hydrocarbon solvent is cyclohexane.

Quenching Agent

In some embodiments, the quenching agent is used to incorporate functional groups into the polymer chain and to terminate polymerization. Suitable quenching agents include any compounds that are suitable for termination. Examples include but are not limited to water, hydroxides, amines, alcohols, thiols, aldehydes, esters, carboxylic acids, carbon dioxide, silanols and derivatives thereof, silicic acids and derivatives thereof, and epoxides. In some embodiments, the quenching agent is a protic source, such as water, a hydroxide, an alcohol, an amine, and a carboxylic acid. In some embodiments, the quenching agent is water. In some embodiments, the protic source is a hydroxide. In some embodiments, the quenching agent is an alcohol. In some embodiments, the quenching agent is an epoxide. Examples of epoxides include but are not limited to ethylene oxide and propylene oxide. In some embodiments, the quenching agent is propylene oxide. In some embodiments, the quenching agent is a silicic acid or a derivative thereof. In some embodiments, the quenching agent is an ester of orthosilicic acid. In some embodiments, the quenching agent is tetraethoxysilane. In some embodiments, the quenching agent is a trialkylsilyl halide. In some embodiments, the quenching agent is trimethylsilyl chloride.

Upon preparation of the dilithium initiator, the initiator may be used for polymerization. In some embodiments, the dilithium initiator, which is prepared as a solution, is added to the polymerization reactor and reacted with a monomer. In some instances, the monomer is a diene. In some instances, the monomer is butadiene. In some instances, the dilithium initiator is stored for several weeks at about 0° C. prior to use. In some instances, the dilithium initiator is stored for several weeks at about −5° C. to about 5° C. prior to use.

Upon preparation of the dilithium initiator, the initiator may be used for polymerization. In some embodiments, the dilithium initiator, which is prepared as a solution, is added to the polymerization reactor and reacted with a combination of at least one monomer. In some embodiments, the monomers are added sequentially. In some embodiments, the monomers are added simultaneously. In some embodiments, the combination comprises a diene. In some embodiments, the combination comprises a vinyl aromatic monomer. In some embodiments, the combination is a diene and a vinyl aromatic. In some embodiments, the combination is butadiene and styrene.

In some embodiments, prior to polymerization, the initiator solution is diluted with a nonpolar solvent. In some embodiments, the nonpolar solvent is toluene. In some embodiments, the nonpolar solvent is cyclohexane. In some embodiments, prior to polymerization, the initiator solution is diluted with a polar solvent. In some embodiment, the polar solvent is methyl tertbutyl ether.

In some embodiments, the amount of polar solvent for polymerization is about 0.0005% wt to about 100% wt. In some embodiments, the amount of polar solvent for polymerization is about 0.0005% wt to about 0.5% wt. In some embodiments, the amount of polar solvent for polymerization is about 0.0005% wt to about 1% wt. In some embodiments, the amount of polar solvent for polymerization is about 0.0005% wt to about 5% wt. In some embodiments, the amount of polar solvent for polymerization is about 0.0005% wt to about 10% wt. In some embodiments, the amount of polar solvent for polymerization is about 0.0005% wt to about 20% wt. In some embodiments, the amount of polar solvent for polymerization is about 0.0005% wt to about 50% wt.

In some embodiments, to terminate the polymerization, the quenching agent is added. In some embodiments, the quenching agent is added directly to the polymerization reactor. In some embodiments, the polymerization reaction mixture is transferred to another reaction vessel containing the quenching agent. In some embodiments, the quenching agent is an epoxide. In some embodiments, the quenching agent is ester of orthosilicic acid. In some embodiments, the quenching agent is a protic solvent. In some embodiments, the quenching agent is a trialkylsilyl halide.

Polymers

The polymers prepared from the methods disclosed herein allow for the preparation of low molecular weight dienes homopolymers and diene-vinyl aromatic copolymers with a wide range of microstructures, viscosities, and Tgs compared to the analogous polymers prepared from butadiene derived initiators. In some embodiments, the polymers prepared herein have terminal hydroxyl functionality. Furthermore, the polymers prepared from the methods disclosed herein have reduced viscosity.

Additionally, methods disclosed herein allow for the preparation of high molecular weight elastomeric diene homopolymers and diene-vinyl aromatic copolymers with a wide range of microstructures and Tgs that are terminally functionalized with various reactive groups. These polymers include styrene block copolymers. In some embodiments, the styrene block copolymers are prepared through a two-step sequential monomer addition. In some embodiments, the styrene block copolymers are prepared through a more than two-step sequential monomer addition [cf. S—B—S—B—S copolymers]. In some embodiments, the styrene block copolymers are prepared through a single step polymerization, wherein the monomers are added together.

Vinyl Content

The polymers produced by the methods disclosed herein have low vinyl content. In some embodiments, the vinyl content is about 10% to about 85%. In some embodiments, the vinyl content is below about 50%, about 55%, about 50%, about 45%, about 40%, about 45%, about 35%, about 30%, about 25%, about 20%, about 19%, about 18%, about 17%, about 16%, about 15%, about 14%, about 13%, about 12%, about 11%, about 10%, about 9%, about 8%, about 7%, about 6%, about 5%, about 4%. In some embodiments, the vinyl content is about 10% to about 50%. In some embodiments, the vinyl content is about 20% to about 50%. In some embodiments, the vinyl content is about 50% to about 85%. In some embodiments, the vinyl content is about 10% to about 25%. In some embodiments, the vinyl content is about 10% to about 30%. In some embodiments, the vinyl content is about 10% to about 20%. In some embodiments, the vinyl content is about 5% to about 25%. In some embodiments, the vinyl content is about 5% to about 20%. In some embodiments, the vinyl content is about 5% to about 15%. In some embodiments, the vinyl content is about 10% to about 20%. In some embodiments, the vinyl content is about 10% to about 15%. In some embodiments, the vinyl content is about 10% to about 12%. In some embodiments, the vinyl content is about 50%. In some embodiments, the vinyl content is about 30%. In some embodiments, the vinyl content is about 25%. In some embodiments, the vinyl content is about 20%. In some embodiments, the vinyl content is about 15%. In some embodiments, the vinyl content is about 10%. In some embodiments, the vinyl content is about 5%.

The polybutadiene diol polymer produced by the methods disclosed herein have low vinyl content. In some embodiments, the vinyl content is about 10% to about 85%. In some embodiments, the vinyl content of the polybutadiene diol polymer is below about 50%, about 55%, about 50%, about 45%, about 40%, about 45%, about 35%, about 30%, about 25%, about 20%, about 19%, about 18%, about 17%, about 16%, about 15%, about 14%, about 13%, about 12%, about 11%, about 10%, about 9%, about 8%, about 7%, about 6%, about 5%, about 4%. In some embodiments, the vinyl content is about 10% to about 50%. In some embodiments, the vinyl content is about 20% to about 50%. In some embodiments, the vinyl content is about 50% to about 85%. In some embodiments, the vinyl content is about 10% to about 25%. In some embodiments, the vinyl content is about 10% to about 30%. In some embodiments, the vinyl content is about 10% to about 20%. In some embodiments, the vinyl content is about 10% to about 15%. In some embodiments, the vinyl content of the polybutadiene diol polymer is about 5% to about 25%. In some embodiments, the vinyl content of the polybutadiene diol polymer is about 5% to about 20%. In some embodiments, the vinyl content of the polybutadiene diol polymer is about 5% to about 15%. In some embodiments, the vinyl content of the polybutadiene diol polymer is about 10% to about 20%. In some embodiments, the vinyl content of the polybutadiene diol polymer is about 10% to about 15%. In some embodiments, the vinyl content of the polybutadiene diol polymer is about 10% to about 12%. In some embodiments, the vinyl content of the polybutadiene diol polymer is about 50%. In some embodiments, the vinyl content of the polybutadiene diol polymer is about 30%. In some embodiments, the vinyl content of the polybutadiene diol polymer is about 25%. In some embodiments, the vinyl content of the polybutadiene diol polymer is about 20%. In some embodiments, the vinyl content of the polybutadiene diol polymer is about 15%. In some embodiments, the vinyl content of the polybutadiene diol polymer is about 10%. In some embodiments, the vinyl content of the polybutadiene diol polymer is about 5%.

In some instances, the polymers prepared by the methods disclosed herein are used to prepare hydrogenated grades of the polymers.

In some instances, the polymers prepared by the methods disclosed herein are engineered rubber products. Examples of engineered rubber products include but are not limited to tires, power transfer and conveyer belting, fluid routing hose, seals and gaskets, and sheeted rubber products.

In some embodiments, the polymer produced is an engineered rubber product. In some embodiments, the engineered rubber product is a tire, a power transfer belt, a conveyor belt, a hose, a seal, a gasket, or a sheeted rubber product.

In some instances, the polymers prepared by the methods disclosed herein are adhesive products. Examples of suitable adhesives include but are not limited to hot melt adhesives, pressure sensitive-adhesive, e.g. tapes and labels, construction adhesives, and elastic films.

In some embodiments, the polymer produced is an adhesive product. In some embodiments, adhesive product is selected from the group consisting of: a hot-melt adhesive, a construction adhesive, an elastic film, and a pressure-sensitive adhesive.

Furthermore, the polymers prepared the by methods disclosed herein may be used for other applications, including but are not limited to soft-touch compounds, asphalt/bitumen modification, impact modification of styrenics and engineered thermoplastics, rigid thermoformed packaging, thermoplastic modification, and oil gels for telecommunication and medical applications. In some embodiments, the polymer prepared is a thermoplastic olefin.

EXAMPLES

In the examples provided herein, a suitable or representative suitable C≥6 diene is a diene that under the reaction conditions described below form a suitable dilithio initiator. Examples include compounds of formula I. Other examples of suitable C≥6 dienes include, but are not limited to, to myrcene, beta-myrcene, farnesene, and beta-farnesene.

Example 1: Butadiene Polymerization with Dilithio Initiator Derived from Farnesene Initiator A 1500 ml sulfonation flask equipped with agitator and submerged cooler, under argon blanket, was charged with 555 g MTBE and 39 g lithium in the form of 10 mm granules (See Table I, Example No. 1). Under agitation at temperature 2-3° C., farnesene—mixture of isomers, Kosher quality W383902, as obtained from Aldrich lab chemical supplier, was slowly added using a pump. Gas chromatography revealed 6% of trans beta-farnesene in the mixture. The solution color changed to yellow immediately after the start of the addition. 70.9 g of farnesene was added during 18 hrs. Then after 1 hr the stirrer was stopped, thereby allowing the lithium metal to flow up. The dirty yellow liquid initiator under the lithium layer was pressure transferred to flask stored at −3° in refrigerator. 4.742 g initiator was transferred by syringe into 10 ml of ethyl alcohol. The consumption of 0.1 N HCl by titration to phenolphthalein was 12.2 ml, revealing alkalinity 0.257 mmol/g of initiator solution. Another sample of the solution, weighing 13.419 g, was neutralized with 0.5 ml allylbromide in the syringe under nitrogen, the non-reacted alkalinity was separated by shaking twice with 5 ml water. The consumption of 0.1N HCl for the alkalinity in the water phase was 3.2 ml, which corresponds to 0.07 mmol/g. The alkalinity of organometal which reacted with allylbromide was 0.182 mmol/g (72.5% C—Li). The molar yield of C—Li:farnesene—mixture of isomers was 32%.

Polymerization

For polymerization, 2000 ml glass pressure reactor was equipped with a stainless steel agitator, a submerged cooler and a nitrogen inlet. 548 g of initiator solution from Example 1 was added to the reactor, followed by adding 62 g of butadiene. The temperature increased from 17 to 45° C. within 5 minutes, the solution remained slightly turbid without formation of precipitate. The second portion of butadiene, totaling 116 g, was added into the reaction mixture within 20 minutes. The temperature was maintained at 50° C. by cooling. Closely before finishing the butadiene addition the reaction mixture was cooled to 13° C.

Termination 358 g solution after the polymerization was mixed with 8 g propyleneoxide in a polyethylene bag under nitrogen, and the resulting semi-rigid reaction mixture was homogenized by kneading. Then, 80 mg BHT was added, and the reaction mixture was washed with water until neutral reaction was achieved (phenolphthalein indicator). The solvent was distilled off from the liquid polymer and the residues of volatiles were removed by water steam and nitrogen purging at 150° C. A clear, slightly yellow liquid polymer was obtained in nearly theoretical yield. The characteristics of the polymer are shown in Table 2, Polymer No. 1. The Mn and Mw values were measured by GPC with polystyrene calibration and recalculated for polybutadiene; the difunctional content (f2) was determined by HPLC; and the vinyl content was measured by IR spectroscopy.

Example 2: Butadiene Polymerization with Dilithio Initiator Derived from Farnesene with Naphthalene as Catalyst for Initiation The initiator was prepared in a similar manner as described in Example 1 with the difference that naphthalene was added to the reaction mixture. Please see Table 1, Example 2 for details for the amounts of reagents used. A dark brown solution was obtained containing 0.4 mmol/g Li and 0.33 mmol/g C—Li. The molar yield of C—Li to farnesene was 60%. The initiator was then used to prepare propylene oxide terminated polybutadiene in procedure similar to Example 1. The characteristics of the polymer obtained are shown in Table 2, Polymer No. 2.

Example 3: Butadiene Polymerization with Dilithio Initiator Derived from Beta-Myrcene The initiator was prepared in a similar manner as described in Example 1 with the difference that beta-myrcene was used instead of farnesene-mixture. The used volumes of reagents are shown in Table 1, Example 3. A dark brown solution was obtained containing 0.54 mmol/g Li and 0.52 mmol/g C—Li. The molar yield of C—Li to beta-myrcene was 87%, which corresponds to initiator structure of dilithiodimer (Li-MM-Li). After dilution with MTBE, the initiator was used to prepare propyleneoxide terminated polybutadiene. The characteristics of the polymer obtained are shown in Table 2, Polymer No. 3.

Example 4: Butadiene Polymerization with Dilithio Initiator Derived from Beta-Myrcene with Naphthalene as Catalyst for Initiation The initiator was prepared in a similar manner as described in Example 3 with the difference that naphthalene was added to the reaction mixture. The used volumes of reagents are shown in Table 1, Example 4. A dark colored solution was obtained containing 0.69 mmol/g Li and 0.67 mmol/g C—Li. The molar yield of C—Li to beta-myrcene was 148%, which corresponds to mixed initiator structure with monomer (Li-M-Li) to dimer (Li-MM-Li) in ratio 1.8 to 1. After dilution with MTBE, the initiator was used to prepare propyleneoxide terminated polybutadiene. The characteristics of the polymer obtained are shown in Table 2, Polymer No. 4.

Example 5: Polymerization with Dilithio Initiator Derived from Farnescene with Benzene/Triethylamine Solvent Mixture Initiation The initiator was prepared in a similar manner as described in Example 1, the difference was that benzene/triethylamine mixture was used as a solvent and naphthalene was used as catalyst. Benzene, anhydrous with 10 ppm of water was obtained from Aldrich. Triethylamine, obtained from Aldrich, was dried by column distilling with benzene to 344 ppm of water. The used volumes of reagents are shown in Table 1, Example 5. A dark colored solution was obtained containing 0.45 mmol/g lithium alkalinity and 0.419 mmol/g C—Li. C—Li content was determined by titration with solution of secondary butyl alcohol in toluene. 0-Phenanthroline hydrate, as obtained from lab chemical supplier Lachema, Brno, was used as indicator. The molar yield of C—Li to farnesene was 61%. The obtained initiator was used to then used to prepare propylene oxide terminated polybutadiene and tri-block copolymer styrene-butadiene-styrene in single step polymerization reaction.

Example 5A: Butadiene Polymerization

Polymerization

The prepared initiator of Example 5 diluted with toluene was used to prepare the propylene oxide terminated polybutadiene according to the procedure described in Example 1. The characteristics of the polymer obtained are shown in Table 2, Polymer No. 5.

Polymer No. 6 (cf. Table 2) was also prepared in a similar manner from initiator diluted with cyclohexane.

Example 5B: Tri-Block Styrene-Butadiene-Styrene Copolymerization

Polymerization and Termination

For the polymerization, 2000 ml glass pressure reactor was used, as described in Example 1. 1217 g of toluene was added to the reactor, followed by 35 milligrams of o-phenanthroline hydrate. 801 milligrams of the initiator from Example 5 was consumed to neutralize the impurities from the solvent and reactor, which was indicated by the change in color to orange. Butadiene, 97.5 g and styrene 41.9 g, were then added into the reactor. Additional portions of the initiator from Example 5, 431 milligrams and 123 milligrams, were needed to compensate for impurities from butadiene and styrene respectively. Into the reactor, then 7.572 g of the dilithium initiator from Example 5 (1,586 millimoles C—Li) was added. The reactor was then immersed into hot water to increase the temperature to 65° C. when the polymerization started. The temperature 65-75° C. was maintained for 46 min. and then 2.4 g of methanol was added to hydrolyze organolithium polymer ends. 160 milligrams of BHT as antioxidant was added into the polymer and solution, and residue alkalinity was washed out from the solution with water. The product was obtained by air drying as slight yellow clear elastomeric polymer. In the absence of polar randomizer, the bifunctional initiator provided the SBS block copolymer in single step addition of butadiene and styrene. The Mn calculated from GPC for styrene-butadiene copolymer with 30% styrene was 87090 g/mol. For the tensile test, a sample was cast into film from toluene solution, dried in air and annealed at 90° C. in vacuum and die-cut into a standard specimen. The elongation at break was 1062%, with a stress at break 21.1 MPa. The hardness was 80 ShA. The lower Tg of the polymer was −84.5° C., the higher Tg was 96.4° C. The other characteristics of the polymer obtained are shown in Table 3, Polymer No. 17.

Example 6: Butadiene Polymerization with Dilithio Initiator Derived from Beta-Myrcene The preparation of initiator was similar to that in Example 1 with the difference that beta-myrcene was used instead of farnesene-mixture and the solvent was toluene with small amount of added MTBE. The reactivity of lithium was enhanced by lithium s-butylalcoholate. The used volumes of reagents are given in Table 1, Example 6. After the reaction, a sticky precipitate was found on the reactor walls. A dark colored solution, separated from the precipitate, contained 0.36 mmol/g Li and 0.31 mmol/g C—Li. The molar yield of C—Li to beta-myrcene was 107% which corresponds nearly to initiator structure of dilithiodimer (Li-MM-Li). After dilution with MTBE, the initiator was used to prepare propylene oxide terminated polybutadiene. The characteristics of the polymer obtained are shown in Table 2, Polymer No. 7.

Example 7: Butadiene Polymerization with Dilithio Initiator Derived from Beta-Myrcene with Benzene/Triethylamine Solvent Mixture The preparation of initiator was similar to that in Example 5 with the difference that beta-myrcene was used instead of farnesene-mixture. The used volumes of reagents are given in Table I, Example 7. After the reaction, the solution of initiator was transferred into storage flask and reactor was washed with benzene and cyclohexane and the wash was added to initiator solution. A dark colored solution contained 0.55 mmol/g Li and 0.415 mmol/g C—Li. The molar yield of C—Li to beta-myrcene was 135% which corresponds to initiator structure of dilithiomonomer:dilithiodimer (Li-M-Li: Li-MM-Li) 1.35:1. After dilution with cyclohexane, the initiator was used to prepare propylene oxide terminated polybutadiene. The characteristics of the polymer obtained are shown in Table 2, Polymer No. 8.

Example 8: Butadiene Polymerization with Dilithio Initiator Derived from Isoprene with Naphthalene as a Catalyst for Initiation The preparation of initiator was similar to that in Example 2 with the difference that isoprene was used instead of farnesene-mixture. The used volumes of reagents are given in Table 1, Example 8. The initiator was obtained as a suspension containing 0.91 mmol/g Li and 0.89 mmol/g C—Li. In this high polar solvent, the molar yield of the isoprene based initiator C—Li to diene was 177%, which corresponds to mixed initiator structure with prevailing dilithiomonomer (Li—I—Li to Li—II—Li ratio 6.5 to 1).

Example 8A: Butadiene Polymerization after Dilution with MTBE

The initiator from Example 8 (designated as 8A) was used, after dilution with MTBE, to prepare propylene oxide terminated polybutadiene. (Table II). The characteristics of the polymer obtained are shown in Table 2, Polymer No. 9.

Example 8B: Butadiene Polymerization after Dilution with Toluene

Part of initiator suspension from Example 8 was decanted several times with toluene, the resulting suspension contained 0.41 mmol/g Li, 0.39 mmol/g C—Li and 1.71% MTBE, corresponding to MTBE to Li molar ratio 1 to 2. Thus obtained initiator designated as 8B was diluted with toluene and used to prepare propylene oxide terminated polybutadiene. The characteristics of the polymer obtained are shown in Table 2, Polymer No. 10.

Example 9: Butadiene Polymerization with Dilithio Initiator Derived from Isoprene The preparation of initiator was similar to that in Example 6 with the difference that isoprene was used instead of beta-myrcene. The used volumes of reagents are shown in Table 1, Example 9. The obtained solution contained 0.238 mmol/g Li and 0.192 mmol/g C—Li. In this polar solvent, the molar yield of the isoprene based initiator C—Li to diene was 22.5%. Part of the initiator remained as insoluble fraction. After dilution with MTBE, the initiator was used to prepare propylene oxide terminated polybutadiene. The characteristics of the polymer obtained are shown in Table 2, Polymer No. 11.

Example 10: Butadiene and Beta-Farnesene Polymerization with Dilithio Initiator Derived from Farnesene Initiator A 1500 ml sulfonation flask equipped with agitator and submerged cooler, under argon blanket, was charged with 560 g MTBE and 28 g lithium in the form of 2 mm granules (See Table 1, Example No. 10, Run 1). Under agitation at temperature 3-10° C., beta-farnesene 98% (by drying) was slowly added using a pump. The solution color changed to yellow immediately after the start of the addition. 25.2 g of farnesene was added during 9.5 hrs. Then after 1 hr the stirrer was stopped, thereby allowing the lithium metal to flow up. The dirty yellow liquid initiator under the lithium layer was pressure transferred to flask stored at −3° in refrigerator. 11.383 g initiator was transferred by syringe into 20 ml of water. The consumption of 0.1 N HCl by titration to phenolphthalein was 24.6 ml, revealing alkalinity 0.216 mmol/g of initiator solution. Another sample of the solution, weighing 12.878 g, was neutralized with 0.5 ml allylbromide in the syringe under nitrogen, the non-reacted alkalinity was separated by shaking twice with 5 ml water. The consumption of 0.1N HCl for the alkalinity in the water phase was 3.2 ml, which corresponds to 0.025 mmol/g. The alkalinity of organometal which reacted with allylbromide was 0.191. mmol/g (88.4% C—Li). The molar yield of C—Li:beta-farnesene was 91%. In subsequent runs 2 and 3 with 99% beta-farnesene (GC), C—Li content was 0,409 mmol/g and 0,432 mmol/g with the molar yield 85% and 92% respectively.

Polymerization

For polymerization, 2000 ml glass pressure reactor was equipped with a stainless steel agitator, a submerged cooler and a nitrogen inlet. 431.5 g of initiator solution from Example 10 was added to the reactor, followed by adding 41 g of butadiene. The temperature increased from 17 to 45° C. within 5 minutes, the solution remained slightly turbid without formation of precipitate. The second portion of butadiene, totaling 100 g, was added into the reaction mixture within 20 minutes. The temperature was maintained at 50° C. by cooling. Closely before finishing the butadiene addition the reaction mixture was cooled to 13° C.

Termination 379 g solution after the polymerization was mixed with 10 g propyleneoxide in a polyethylene bag under nitrogen, and the resulting semi-rigid reaction mixture was homogenized by kneading. Then, 80 mg BHT was added, and the reaction mixture was washed with water until neutral reaction was achieved (phenolphthalein indicator). The solvent was distilled off from the liquid polymer and the residues of volatiles were removed by nitrogen purging at 150° C. A clear, slightly yellow liquid polymer was obtained in nearly theoretical yield. The characteristics of the polymer are shown in Table 2, Polymer No. 12. The Mn and Mw values were measured by GPC with polystyrene calibration and recalculated for polybutadiene; the difunctional content (f2) was determined by HPLC; and the vinyl content was measured by IR spectroscopy.

In a similar way, difunctional hydroxyl terminated polyfarnesene was prepared by polymerization of beta-farnesene. (Table 2, Polymer No. 14)

Example 11: Butadiene or Beta Farnesene Polymerization with Dilithio Initiator Derived from Farnesene with Naphthalene as Catalyst for Lithium Dissolving The initiator was prepared in a similar manner as described in Example 10 with the difference that naphthalene was added to the reaction mixture. Please see Table 1, Example 11 for details for the amounts of reagents used. A dark brown solution was obtained containing 0.75 mmol/g Li and 0.73 mmol/g C—Li. The molar yield of C—Li to beta-farnesene was 150% which corresponds to initiator having mixed structure of monomeric (Li—F—Li) to dimeric (Li—FF—Li) dilithium adduct to beta-farnesene in ratio 2 to 1. The initiator was then used to prepare propylene oxide terminated polybutadiene in procedure similar to Example 10. The characteristics of the polymer obtained are shown in Table 2, Polymer No. 13.

In a similar way, difunctional hydroxyl terminated polyfarnesene was prepared by polymerization of beta-farnesene. (Table 2, Polymer No. 15).

Example 12: Butadiene Polymerization with Dilithio Initiator Derived from Beta-Farnesene The preparation of initiator was similar to that in Example 10 with the difference that the solvent was toluene with small amount of added MTBE. The reactivity of lithium metal was enhanced by s-butylalcohol. The used volumes of reagents are given in Table 1, Example 12. A dark colored solution contained 0.98 mmol/g Li and 0.805 mmol/g C—Li. The molar yield of C—Li to beta-farnesene was 132% which corresponds to initiator containing mixture of dilithiomer (Li—F—Li) with dilithiodimer (Li—FF—Li) in molar ratio 1 to 1. After dilution with toluene, the initiator was used to prepare propylene oxide terminated polybutadiene. The glass transition temperature of the polymer, as measured by DSC, was −67.6° C. The characteristics of the polymer obtained are shown in Table 2, Polymer No. 16.

Example 13: Butadiene Polymerization to Low Vinyl PB Rubber

Initiator

The initiator was prepared in a similar manner as described in Example 10, the difference was that benzene/ triethylamine mixture was used as a solvent and naphthalene was used as catalyst. Benzene, anhydrous with 10 ppm of water was obtained from Aldrich. Triethylamine, obtained from Aldrich, was dried by column distilling with benzene to 344 ppm of water. The used volumes of reagents are shown in Table 1, Example 13. A dark colored solution was obtained containing 0.926 mmol/g lithium alkalinity and 0.844 mmol/g C—Li. C—Li content was determined by titration with solution of secondary butyl alcohol in toluene. 0-Phenanthroline hydrate, as obtained from lab chemical supplier Lachema, Brno, was used as indicator. The molar yield of C—Li to farnesene was 138%. The obtained initiator was used to prepare polybutadiene and randomized copolymer styrene-butadiene.

Polymerization

For the polymerization, 2000 ml glass pressure reactor was used, as described in Example 10. The characteristics of the polymer are shown in Table 3, Polymer No. 18. 912 g cyclohexane was added to the reactor, followed by 9 milliliters of 0.1% o-phenanthroline hydrate solution and 113 g butadiene. The initiator was diluted with cyclohexane from 1,451 g to 3,732 g. 0.432 g (0.162 mmol) of the diluted initiator was consumed to neutralize the impurities from the solvent and monomer, which was indicated by the change in color to orange. Into the reactor, then 2.619 g (0.98 mmol) of the diluted initiator was added. The target molecular weight of the polymer Mt was calculated as 119/.98*2*1000=243000 g/mol. The reactor was then heated to 79° C. when the polymerization started. The temperature peaked at 84° C. within 15 minutes, then the solution was left spontaneously cooling down to 65° C. within 2 hrs. Then 165 milligrams of BHT in 20 ml ethanol was added into the solution, and residue alkalinity was neutralized with 56 milligrams of 85% $H_3PO_4$. The product was obtained by air drying as slight yellow clear elastomeric polymer.

Example 14: Butadiene and Styrene Polymerization to SBR Rubber Terminated with Trimethylsilyl Chloride Polymerization For the polymerization, 2000 ml glass pressure reactor was used, as described in Example 10. The characteristics of the polymer are shown in Table 3, Polymer No. 19. 877 g cyclohexane, 16.6 g styrene, 4.702 g of 0.14 mmol/g solution of N,N,N',N'-tetramethylethylenediamine (Aldrich) in cyclohexane, and 54 g butadiene was added to the reactor. Initiator from Example 10, Run 3 diluted with cyclohexane to 0.109 mmol/g C—Li was used. The impurities from the solvent and monomer were neutralized by slowly adding initiator, until slight color appeared (2.124 g). Then the initiator calculated (7.915 g) for target molecular weight Mt=163500 g/mol was added. The reactor was then maintained at 50° C. 2.7 hrs.

Termination

Then 76 milligrams of trimethylsilyl chloride (Aldrich) as 5.75% solution in cyclohexane was added. As after 2 hrs. at 40° C. the solution was not completely discolored, another portion 0,219 g of the 5.75.% solution of trimethylsilylchloride was added. The color nearly disappeared at standing during 24 hrs. at 25-30° C. 0.074 g BHT as solution in 3.3 g cyclohexane was mixed into the polymer solution. The product was obtained by air drying as slight yellow clear elastomeric polymer. The polymer was purified by precipitation from methyl-tert.butyl ether into iso-propyl alcohol, dissolving the precipitate in MTBE with BHT and air drying.

Example 15: Butadiene Polymerization to Mid-Vinyl PB Rubber Terminated with Trimethylsilyl Chloride Polymerization For the polymerization, 2000 ml glass pressure reactor was used, as described in Example 10. The characteristics of the polymer are shown in Table 3, Polymer No. 20. 880 g cyclohexane, 4.78 g of 0.14 mmol/g solution of N,N,N',N'-tetramethylethylenediamine (Aldrich) in cyclohexane, and 66.5 g butadiene was added to the reactor, Initiator from Example 10, Run 3 diluted with cyclohexane to 0.109 mmol/g C—Li was used. The impurities from the solvent and monomer were neutralized by slowly adding initiator, until slight color appeared (1.194 g). Then the initiator calculated (6.323 g) for target molecular weight Mt=193000 g/mol was added. The reactor was then maintained at 50° C. within 3.1 hrs.

Termination

Then 89 milligrams of trimethylsilyl chloride (Aldrich) as 5.75% solution in cyclohexane was added. The color nearly disappeared within 10 minutes at 40° C. After standing overnight at room temperature, the product was stabilized with BHT and air dried to slight yellow clear elastomeric polymer. The polymer was purified by precipitation from methyl-tert.butyl ether into iso-propyl alcohol, dissolving the precipitate in MTBE with BHT and air drying.

Example 16: Butadiene Polymerization to Low-Vinyl PB Rubber

Polymerization

For the polymerization, 2000 ml glass pressure reactor was used, as described in Example 10. The characteristics of the polymer are shown in Table 3, Polymer No. 21.

853 g cyclohexane was charged to the reactor. Then 5,431 g of dilithiodifarnesene initiator solution in MTBE, from Example 10, Run 3, containing 0.432 mmol/g C—Li was dropwise added under stirring at 57° C. The neutralization of initiator consumed 0.4 g (0.17 mmol) of the initiator, leaving 2.176 mmol for initiation of the polymerization. 26 g of butadiene was added at 80°. The reactor was heated to 92° C. Within 15 min. the pressure 0.72 bar gauge started to decrease. Then the total of 100.5 g butadiene for target molecular weight 92800 g/mol was added at 93° C. The reactor was then stirred another 40 min to complete polymerization, ending at 69° C. The 30 ml sample of the slight yellow polymer solution was taken into the syringe containing a few droplets of ethanol, 1 ml of cyclohexane and 5 mg BHT. The polybutadiene was precipitated from MTBE/isopropyl alcohol. Vinyl content 16.7% was found.

Example 17: Butadiene and Styrene Polymerization to Mid-Vinyl SBR Rubber Terminated with Propylene Oxide Polymerization For the polymerization, 2000 ml glass pressure reactor was used, as described in Example 10. The characteristics of the polymer are shown in Table 3, Polymer No. 22.

822 g cyclohexane, 28.3 g styrene, 21.9 g of 0.14 mmol/g solution of N,N,N',N'-tetramethylethylenediamine (Aldrich) in cyclohexane, and 86.2 g butadiene was added to the reactor. Initiator from Example 10, run 3, solution in MTBE containing 0,432 mmol/g C—Li was dropwise added at 24° C., ending up at 4.081 g, from which 0.16 mmol was for neutralization of impurities, 1.623 mmol for the polymerization. The reaction mixture was heated to 53° C., the polymerization started in 3 min. as seen by heat evolution. The temperature peaked at 72° C. in 20 min. In 38 min. the polymerization was finished at 61° C. Small sample of the characteristic red-orange colored solution was hydrolyzed with ethanol under nitrogen in round bottomed flask, and stabilized with BHT. The copolymer without functional groups was obtained by precipitation from MTBE/isopropyl alcohol.

Termination

The characteristics of the polymer are shown in Table 3, Polymer No. 23.

The polymer solution was cooled to 17° C., 10 ml propylene oxide were added into the reactor without stirring. Upon resuming the agitation, white "gel" was formed immediately, which indicates biofunctionality of the copolymer molecule. The agitator, that digged a hole in the "gel", had to be stopped. No change of the "gel" consistency was observed in 40 min. Then, the solution of 128 mg BHT in 5 g cyclohexane and 5 g ethanol was added into the reactor. The "gel" hydrolyzed, permitting to resume the agitation. 0.190 g of 2-ethylhexanoic acid was added to the solution to neutralize the alkalinity. Slight yellow, clear elastomeric polymer was obtained from the homogenized solution by air drying. The polymer was purified by precipitation from MTBE into isopropyl alcohol. The gel permeation chromatograms of the polymer No. 22 and polymer No. 23 are shown in FIG. 1.

TABLE 1

Reagents Used and Reaction Conditions for Initiators

| Example Number | Lithium | Solvent, Reactor | Catalyst | Diene | Temperature | Addition Time |
|---|---|---|---|---|---|---|
| 1 | 10 mm granulate, 39 g | MTBE, 555 g, 1.5 liter flask | — | Farnesene Kosher mixture of isomers 70.9 g | 2 to 3° C. | 18 h |
| 2 | 10 mm granulate, 35 g | MTBE, 551 g, 1.5 liter flask | Naphthalene, 0.8 g | Farnesene Kosher mixture of isomers 69.1 g | −0.5° C. | 9 h |
| 3 | 10 mm granulate, 57 g | MTBE, 1300 g, 4 liter flask | — | beta-myrcene, 115 g | −5 to −1° C. | 22.3 h |
| 4 | 10 mm granulate, 54 g | MTBE, 1300 g, 4 liter flask | Naphthalene, 2 g | beta-myrcene, 86 g | −4 to −3° C. | 17.5 h |
| 5 | 2 mm granulate, 66 g | Benzene, 575 g Triethylamine, 30 g, 1.5 liter flask | Naphthalene, 0.8 g | Farnesene Kosher mixture of isomers 70.1 g | 3 to 4° C. | 30.6 h |
| 6 | 10 mm granulate, 54 g | Toluene, 1420 g, MTBE 72 g, 4 liter flask | 74.5 mmol 2-butanolate-Li in 104 g toluene soln., +Naphthalene, 2 g | beta-myrcene, 66 g | −5° C. | 13.6 h |
| 7 | 2 mm granulate, 62 g | Benzene, 575 g Triethylamine, 30 g, 1.5 liter flask; wash combined with initiator soln: benzene 190 g, cyclohexane 709 g, | Naphthalene, 0.8 g | beta-myrcene, 63 g | 3 to 5° C. | 29.9 h |
| 8 | 10 mm granulate, 50 g | MTBE, 1800 g, 4 liter flask | Naphthalene, 2.7 g | isoprene 64.6 g | −2 to 0° C. | 17.4 h |
| 9 | 10 mm granulate, 55 g | Toluene, 1850 g, MTBE 95 g, 4 liter flask | 94.6 mmol 2-butanolate-Li in 132 g toluene soln., +Naphthalene, 2.9 g | isoprene 83 g | 3 to 4° C. | 22.7 h |
| 10 Run 1 | 2 mm granulate, 28 g | MTBE, 560 g, 1.5 liter flask | — | beta-Farnesene ("Standard Purity"; 1% Farnesol), 25.2 g | 3 to 4° C. | 9.5 h |

TABLE 1-continued

Reagents Used and Reaction Conditions for Initiators

| Example Number | Lithium | Solvent, Reactor | Catalyst | Diene | Temperature | Addition Time |
|---|---|---|---|---|---|---|
| 10 Run 2 | 2 mm granulate, 150 g | MTBE, 549 g, 2.5 liter flask | — | beta-Farnesene ("Standard Purity"; 1% Farnesol), 60 g | 1 to 2° C. | 6.9 h |
| 10 Run 3 | 2 mm granulate, 30 g | MTBE, 549 g, 1.5 liter flask | — | beta-Farnesene ("High Purity"; no Farnesol), 58.3 g | 2° C. | 7.1 h |
| 11 | 2 mm granulate, 70 g | MTBE, 1012 g, 2.5 liter flask | Naphthalene, 1.4 g | beta-Farnesene ("High Purity; no Farnesol"), 112 g | 1 to 2° C. | 11 h |
| 12 | 2 mm granulate, 50 g | Toluene, 600 g, MTBE 31 g, 1.5 liter flask | 2-butanol, 2.3 g, Naphthalene, 0.8 g | beta-Farnesene ("Standard Purity"; 1% Farnesol), 90.6 g | 2 to 3° C. | 48.4 h |
| 13 | 2 mm granulate, 56 g | Benzene, 580 g Triethylamine, 31 g, cyclohexane wash combined with initiator 42 g | Naphthalene, 0.8 g | beta-Farnesene ("High Purity; no Farnesol"), 91.2 g | 5 to 6° C. | 46.3 h |

TABLE 2

Properties of Liquid Polymers

| Polymer No. | Initiator | Additional solvent | Monomer used | Polymer cement | $M_{target}$ (g/mol) | $M_n$ (g/mol) | $M_w/M_n$ | f2 (%) | Vinyl (%) IR |
|---|---|---|---|---|---|---|---|---|---|
| 1 | Example 1 | None | Butadiene | 18 | 2860 | 2370 | 1.164 | 86.7 | 48 |
| 2 | Example 2 | None | Butadiene | 26 | 2618 | 1548 | 1.395 | 59.4 | 56 |
| 3 | Example 3 | MTBE | Butadiene | 25 | 2118 | 1693 | 1.09 | 92.4 | 57 |
| 4 | Example 4 | MTBE | Butadiene | 25 | 3000 | 2685 | 1.07 | 96.8 | 59 |
| 5 | Example 5 | Toluene | Butadiene | 8.3 | 3318 | 4676 | 1.18 | 51.3 | 27 |
| 6 | Example 5 | Cyclohexane | Butadiene | 7.4 | 3388 | 4141 | 1.351 | 40.5 | 21 |
| 7 | Example 6 | MTBE | Butadiene | 26.5 | 3240 | 3253 | 1.18 | 95.3 | 50 |
| 8 | Example 7 | Cyclohexane MTBE added before termination with propyleneoxide | Butadiene | 12.1 | 3118 | 3613 | 1.288 | 92.0 | 22 |
| 9 | Example 8a | MTBE | Butadiene | 19.4 | 3000 | 2219 | 1.07 | 96.1 | 58 |
| 10 | Example 8b | toluene | Butadiene | 12 | 2470 | 2248 | 2.12 | 89.8 | 35 |
| 11 | Example 9 | MTBE | Butadiene | 12.7 | 2750 | 2720 | 1.23 | 93 | 43 |
| 12 | Example 10, Run 1 | None | Butadiene | 22 | 3000 | 2633 | 1.073 | 96.7 | 52 |
| 13 | Example 11 | MTBE | Butadiene | 25 | 3118 | 2569 | 1.091 | 90.6 | 40 |
| 14 | Example 10, run 2 | MTBE | beta-farnesene | 15 | 10118 | 6933 | 1.255 | 94.8 | 40 |
| 15 | Example 11 | MTBE | beta-Farnesene | 15 | 2108 | 1392 | 1.714 | 93.1 | 40 |
| 16 | Example 12 | Toluene | Butadiene | 21→10 | 3000 | 2563 | 1.14 | 95.5 | 36 |

TABLE 3

Properties of Elastomeric Polymers

| Polymer No. | Initiator | Polymer type | $M_{target}$ (g/mol) | $M_n$ (g/mol) | $M_w/M_n$ | Vinyl (%) | Tg 1 (° C.) | Tg 2 (° C.) |
|---|---|---|---|---|---|---|---|---|
| 17 | Example 5 | SBS tapered block | 88k | 84k | 2.34 | 24 | −84.5 | 96.4 |
| 18 | Example 13 | PB | 250k | 288k | 1.67 | 13 | −97.8 | — |
| 19 | Example 10, Run 3 | SBR 23.5% Styrene, —SiMe3 terminated | 163k | 174k | 1.36 | 65 | −26.3 | — |
| 20 | Example 10, Run 3 | PB —SiMe3 terminated | 193k | 158k | 1.31 | 74 | −36 | — |
| 21 | Example 10, Run 3 | PB | 93k | 89k | 1.33 | 16.7 | −86.9 | — |
| 22 | Example 10, Run 3 | SBR 25.5% Styrene | 141k | 109k | 1.29 | 71 | −25.5 | — |
| 23 | Example 10, Run 3 | SBR 25.5% Styrene 2-hydroxypropyl terminated | 141k | 118k | 1.14 | N/D | N/D | N/D |

Example 18: Dilithium Initiator Derived from Representative C≥6 Diene

A 1500 ml sulfonation flask equipped with agitator and submerged cooler, under argon blanket, is charged with 560 g MTBE and 28 g lithium in the form of 2 mm granules. Under agitation at temperature 3 to 4° C., an amount of a representative C≥6 diene, such as 25.2 g, is added slowly using a pump over a 9.5 hour period. The stirring is stopped, thereby allowing the lithium metal to flow up. The liquid initiator under the lithium layer is then pressure transferred to flask stored at −3° in refrigerator. A suitable amount of initiator is transferred by syringe into 10 ml of ethyl alcohol and titrated with 0.1 N HCl with phenolphthalein to determine the alkalinity of initiator solution. Another sample of the solution, is neutralized with allylbromide in the syringe under nitrogen, and the non-reacted alkalinity is separated by shaking twice with 5 ml water. The alkalinity of the organometal is measured to determine the yield of mol of C—Li per mol diene. The formation of diene dimer is confirmed by GPC of hydrolyzed sample of the initiator.
Polymerization
For polymerization, a 2000 ml glass pressure reactor is equipped with a stainless steel agitator, a submerged cooler and a nitrogen inlet. 431 g of initiator solution from Example 18 is added to the reactor, followed by adding 41 g of butadiene. The second portion of butadiene, totaling 101 g, is added into the reaction mixture within 18 minutes. The temperature is maintained at 50° C. by cooling. Before finishing the butadiene addition, the reaction mixture is cooled to 13° C.
Termination
379 g solution after the polymerization is mixed with 10 g propyleneoxide in a polyethylene bag under nitrogen, and the resulting semi-rigid reaction mixture is homogenized by kneading. Then, 80 mg BHT is added, and the reaction mixture is washed with water until neutral reaction is achieved (phenolphthalein indicator). The solvent is distilled off from the liquid polymer and the residues of volatiles were removed by water steam and nitrogen purging at 150° C. The following characteristics of the polymer obtained are determined: Mn and Mw values are measured by GPC with polystyrene calibration and recalculated for polybutadiene; the difunctional content (f2) is determined by HPLC; and the vinyl content is measured by IR spectroscopy.

Example 19: Dilithium Initiator Derived from Representative C≥6 Diene with Naphthalene Catalyst The preparation of initiator was similar to that in Example 18 with the difference that naphthalene is added as catalyst. The obtained initiator is titrated as described in Example 18.
The obtained initiator may be used for polymerization reactions. For instance, the obtained initiator is used to prepare propylene oxide terminated polybutadiene as described herein, such as in Examples 1 and 18. Or, the obtained initiator is used to prepare tri-block copolymer styrene-butadiene-styrene as described in Example 5.

Example 20: Dilithium Initiator Derived from Representative C≥6 Diene with Lithium s-Butylalcoholate The preparation of initiator was similar to that in Example 18 with the following modifications: the solvent is toluene with a small amount of MTBE and lithium s-butylalcoholate is also used to enhance reactivity. The obtained initiator is titrated as described in Example 18.
The obtained initiator may be used for polymerization reactions. For instance, the obtained initiator is used to prepare propylene oxide terminated polybutadiene as described herein, such as in Examples 1 and 18. Or, the obtained initiator is used to prepare tri-block copolymer styrene-butadiene-styrene as described in Example 5.

Example 21: Dilithium Initiator Derived from Representative C≥6 Diene with Benzene/Triethylamine Solvent The preparation of initiator was similar to that in Example 18 with the following modifications: benzene/triethylamine mixture is used as a solvent and naphthalene is added as catalyst. The obtained initiator is titrated as described in Example 18.
The obtained initiator may be used for polymerization reactions. For instance, the obtained initiator is used to prepare propylene oxide terminated polybutadiene as described in Examples 1 and 18. Or, the obtained initiator is used to prepare tri-block copolymer styrene-butadiene-styrene as described in Example 5.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A composition comprising: lithium, a solvent or solvent mixture, and a compound represented by the following formula I:

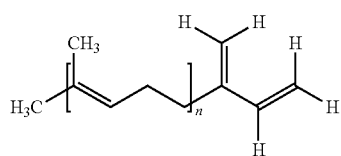

wherein n is 1 or 2.

2. The composition of claim 1, wherein the composition further comprises a catalyst.

3. The composition of claim 1, wherein the solvent is a nonpolar hydrocarbon solvent.

4. The composition of claim 1, wherein the solvent mixture is a blend of a nonpolar hydrocarbon solvent and a polar solvent.

5. The composition of claim 4, wherein the solvent mixture comprises about 0.5% by weight to about 5% by weight of the polar solvent.

6. The composition of claim 1, wherein the lithium is lithium metal.

7. The composition of claim 2, wherein the catalyst is naphthalene.

8. The composition of claim 7, wherein the catalyst further comprises a lithium alcoholate.

9. The composition of claim 8, wherein the lithium alcoholate is lithium 2-butanolate.

10. The composition of claim 1, wherein formula I is beta-farnesene.

11. The composition of claim 1, wherein formula I is beta-myrcene.

* * * * *